United States Patent
Chen

(10) Patent No.: US 9,215,612 B2
(45) Date of Patent: Dec. 15, 2015

(54) PACKET LOSS PROCESSING METHOD, DESTINATION NETWORK NODE DEVICE AND MOBILE TRANSMISSION NETWORK SYSTEM

(71) Applicant: Huawei Technologies Co., Ltd., Shenzhen, Guangdong (CN)

(72) Inventor: Meng Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 149 days.

(21) Appl. No.: 14/081,804

(22) Filed: Nov. 15, 2013

(65) Prior Publication Data
US 2014/0071817 A1    Mar. 13, 2014

Related U.S. Application Data

(63) Continuation of application No. PCT/CN2011/074095, filed on May 16, 2011.

(51) Int. Cl.
*H04W 28/02*    (2009.01)
*H04W 24/08*    (2009.01)
(Continued)

(52) U.S. Cl.
CPC ....... *H04W 28/0242* (2013.01); *H04L 41/0645* (2013.01); *H04L 43/0829* (2013.01); *H04W 24/08* (2013.01); *H04L 12/24* (2013.01)

(58) Field of Classification Search
CPC ....... H04L 12/24; H04L 41/00; H04L 41/042; H04L 41/08
See application file for complete search history.

(56) References Cited

U.S. PATENT DOCUMENTS 6,134,230 A * 10/2000 Olofsson et al. ............... 370/337
8,054,826 B2 * 11/2011 Cheng et al. ................... 370/352
(Continued)

FOREIGN PATENT DOCUMENTS

CN    1777126 A    5/2006
CN    101309125 A    11/2008
(Continued)

OTHER PUBLICATIONS

"Series Y: Global Information Infrastructure, Internet Protocol Aspects and Next-Generation Networks; Internet protocol aspects—Operation, administration and maintenance; OAM functions and mechanisms for Ethernet based networks," ITU-T Recommendation Y.1731, ITU (May 2006).

*Primary Examiner* — Raj Jain
(74) *Attorney, Agent, or Firm* — Leydig, Voit & Mayer, Ltd.

(57) ABSTRACT

Embodiments of the present invention provide a packet loss processing method, a destination network node device and a mobile transmission network system. The method includes: receiving, by a destination network node device, data sent through at least two transmission quality measurement protocol links by a source network node device, where service priorities of the at least two transmission quality measurement protocol links are different; and determining a reason for occurrence of packet loss according to packet loss ratios and the service priorities on the at least two transmission quality measurement protocol links when it is detected that packet loss occurs on the at least two transmission quality measurement protocol links. Technical solutions of the embodiments of the present invention for distinguishing bit error packet loss and congestion packet loss are high in efficiency.

11 Claims, 3 Drawing Sheets

(51) Int. Cl.
*H04L 12/26* (2006.01)
*H04L 12/24* (2006.01)

(56) References Cited

U.S. PATENT DOCUMENTS

| | | |
|---|---|---|
| 2005/0025050 A1 | 2/2005 | Roeder |
| 2006/0018284 A1* | 1/2006 | Rudolf et al. ............. 370/332 |
| 2008/0019340 A1* | 1/2008 | Ohta et al. ............... 370/338 |
| 2009/0327844 A1 | 12/2009 | Suneya |
| 2010/0284303 A1* | 11/2010 | Catovic et al. ............ 370/254 |

FOREIGN PATENT DOCUMENTS

| | | |
|---|---|---|
| CN | 101557607 A | 10/2009 |
| CN | 101582836 A | 11/2009 |
| CN | 101686100 A | 3/2010 |
| CN | 101753367 A | 6/2010 |

* cited by examiner

PACKET LOSS PROCESSING METHOD, DESTINATION NETWORK NODE DEVICE AND MOBILE TRANSMISSION NETWORK SYSTEM

CROSS-REFERENCE TO RELATED APPLICATIONS

This application is a continuation of International Patent Application No. PCT/CN2011/074095, filed on May 16, 2011, which is hereby incorporated by reference in its entirety.

TECHNICAL FIELD

Embodiments of the present invention relate to the field of communications technologies, and in particular, to a packet loss processing method, a destination network node device and a mobile transmission network system.

BACKGROUND

In the prior art, Ethernet belongs to a packet switched network, and transmission performance indexes of an Ethernet network have a significant influence on quality of various services borne by a transmission network, user experience, and so on. Therefore, it is particularly important to measure and monitor the transmission performance indexes of the Ethernet network. The transmission performance indexes of the Ethernet network include transmission packet loss, a transmission delay, a transmission jitter, and the like, where the influence of the transmission packet loss on quality of various services borne by Ethernet is particularly serious.

The transmission packet loss mainly includes packet loss caused by network congestion and packet loss caused by a transmission bit error. Reasons for the two types of packet loss are not the same, and adopted remedial measures are completely not the same either. If a reason for packet loss cannot be accurately distinguished, an adopted remedial measure may cause more serious packet loss, so that service quality is further deteriorated. Therefore, how to accurately distinguish a reason for packet loss is a very important task in Ethernet. In an existing method for distinguishing bit error packet loss and congestion packet loss, a tentative method is generally adopted, where when packet loss occurs, first a service is controlled to reduce a rate, and then whether the packet loss disappears is observed, and if the packet loss does not disappear, the rate is continuously reduced, until a packet loss phenomenon disappears. Alternatively, on the contrary, first data is transferred at a low rate, and if packet loss does not occur, the data transmission rate is gradually increased, and the rate is not reduced until the packet loss is found. After continuous attempts, a rough maximal traffic value of network transmission can be obtained; when a base station finds that data transmission traffic is far less than the maximal traffic value, but in this case, packet loss still occurs, it is determined that bit error packet loss occurs, while packet loss occurring in the base station at a value close to the maximal traffic value of network transmission is determined as congestion packet loss.

In a process of implementing the present invention, the inventor finds that the prior art has at least the following problems: In the existing method for distinguishing bit error packet loss and congestion packet loss, a conclusion can be drawn through a large number of attempts, and a determining process is complex; moreover, in an actual application, erroneous determination often occurs, and in particular, when congestion packet loss and bit error packet loss exist simultaneously, a probability of erroneous determination is high. Therefore, an existing solution for distinguishing bit error packet loss and congestion packet loss is low in efficiency.

SUMMARY

Embodiments of the present invention provide a packet loss processing method, a destination network node device and a mobile transmission network system, which are used to solve a defect in the prior art that efficiency of distinguishing bit error packet loss and congestion packet loss is low, and can accurately identify a reason for packet loss.

An embodiment of the present invention provides a packet loss processing method, where the method is applied in a mobile transmission network, and the method includes:

receiving, by a destination network node device, data sent through at least two transmission quality measurement protocol links by a source network node device, where service priorities of the at least two transmission quality measurement protocol links are different; and determining a reason for occurrence of packet loss according to packet loss ratios on the at least two transmission quality measurement protocol links and the service priorities of the at least two transmission quality measurement protocol links when the destination network node device detects that packet loss occurs on the at least two transmission quality measurement protocol links, where the source network node device is a base station or a base station controller; and the destination network node device is a base station or a base station controller.

An embodiment of the present invention provides a destination network node device, where the destination network node device is located in a mobile transmission network, and the destination network node device is a base station or a base station controller; and the destination network node device includes:

a receiving module, configured to receive data sent through at least two transmission quality measurement protocol links by a source network node device, where service priorities of the at least two transmission quality measurement protocol links are different; and the source network node device is a base station or a base station controller; and a determining module, configured to determine a reason for occurrence of packet loss according to packet loss ratios on the at least two transmission quality measurement protocol links and the service priorities of the at least two transmission quality measurement protocol links when the receiving module detects that packet loss occurs on the at least two transmission quality measurement protocol links used for receiving data.

An embodiment of the present invention further provides a mobile transmission network system, including a source network node device and a destination network node device, where the source network node device is a base station or a base station controller; the destination network node device is a base station or a base station controller; and the destination network node device is configured to receive data sent through at least two transmission quality measurement protocol links by the source network node device, where service priorities of the at least two transmission quality measurement protocol links are different; and determine a reason for occurrence of packet loss according to packet loss ratios on the at least two transmission quality measurement protocol links and the service priorities of the at least two transmission quality measurement protocol links when it is detected that packet loss occurs on the at least two transmission quality measurement protocol links.

In the packet loss processing method, the destination network node device and the mobile transmission network system of the embodiments of the present invention, a destination network node device receives data sent through at least two transmission quality measurement protocol links by a source network node device, where service priorities of the at least two transmission quality measurement protocol links are different; and determines a reason for occurrence of packet loss according to packet loss ratios on the at least two transmission quality measurement protocol links and the service priorities of the at least two transmission quality measurement protocol links when it is detected that packet loss occurs on the at least two transmission quality measurement protocol links. By adopting technical solutions of the embodiments of the present invention, a reason for occurrence of packet loss can be accurately determined according to a packet loss ratio of a data packet and a priority of a transmission quality measurement protocol link for transmitting the data packet. Compared with the prior art, a determining process is simple, and a determining result is accurate. Therefore, the technical solutions of the embodiments of the present invention for distinguishing bit error packet loss and congestion packet loss are high in efficiency.

BRIEF DESCRIPTION OF DRAWINGS

To describe the technical solutions in the embodiments of the present invention or in the prior art more clearly, the following briefly introduces accompanying drawings required for describing the embodiments or the prior art. Apparently, the accompanying drawings in the following description show merely some embodiments of the present invention, and persons of ordinary skill in the art may still derive other drawings according to these accompanying drawings without creative efforts.

DESCRIPTION OF EMBODIMENTS

To make the objectives, technical solutions, and advantages of the embodiments of the present invention clearer, the following clearly and describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
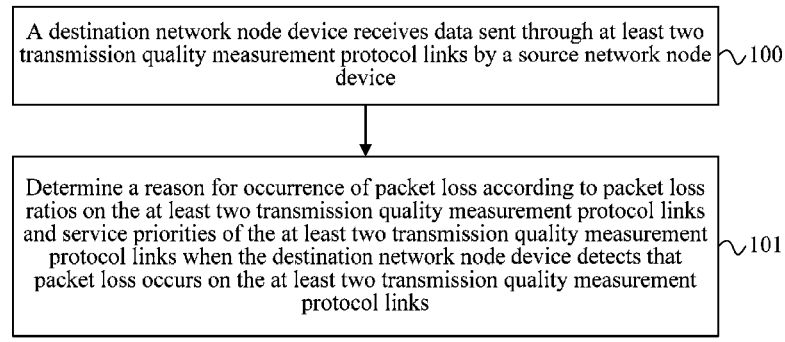
FIG. 1 is a flow chart of a packet loss processing method according to a first embodiment of the present invention.

FIG. 1 is a flow chart of a packet loss processing method according to a first embodiment of the present invention. As shown in FIG. 1, the packet loss processing method of this embodiment applies between end-to-end service bearing devices in a transmission network. If a sending end is taken as a source network node device, and a receiving end is taken as a destination network node device, an execution body of the packet loss processing method of this embodiment is the destination network node device. As shown in FIG. 1, the packet loss processing method of this embodiment may specifically include the following steps:

Step 100: A destination network node device receives data sent through at least two transmission quality measurement protocol links by a source network node device.

Service priorities of the at least two transmission quality measurement protocol links are different.

Step 101: Determine a reason for occurrence of packet loss according to packet loss ratios on the at least two transmission quality measurement protocol links and the service priorities of the at least two transmission quality measurement protocol links when the destination network node device detects that packet loss occurs on the at least two transmission quality measurement protocol links.

Widely used Ethernet networking manners may be divided into two types: a transmission network networking manner based on layer 3 and a transmission network networking manner based on layer 2. The transmission network networking manner based on layer 3 is a transmission network networking manner based on (Internet Protocol; hereinafter referred to as IP) address forwarding; the transmission network networking manner based on layer 2 is a transmission network networking manner based on mandatory access control (Mandatory Access Control; hereinafter referred to as MAC) address forwarding. A transmission network performance index measurement method based on layer 3 (namely, based on IP address forwarding) is implemented by frequently using a transmission network (IP address) performance monitor (IP Performance Monitor; hereinafter referred to as IP PM) protocol based on layer 3 in the industry. A transmission network performance index measurement method based on layer 2 (based on MAC address forwarding) is implemented by frequently using a Y.1731 protocol in the industry. Moreover, the IP PM protocol and the Y.1731 protocol both may perform end-to-end (such as, a base station to a base station controller) packet loss ratio measurement, but neither of these two protocols defines a method for distinguishing bit error packet loss and congestion packet loss. The technical solution of the embodiment of the present invention may implement determination of a reason for packet loss based on the IP PM protocol and the Y.1731 protocol. Certainly, determination of the reason for packet loss may also be implemented based on any other transmission quality measurement protocol used by transmission networking.

In this embodiment, the source network node device may be a base station (Base Transceiver Station; hereinafter referred to as BTS) or a base station controller (Base Station Controller; hereinafter referred to as BSC); the destination network node device is a BTS or a BSC. That is to say, the packet loss processing method of this embodiment may apply to detect a reason for packet loss between a BTS and a BSC in a mobile transmission network, and may also be applied to detect a reason for packet loss between a BTS and a BTS, or between a BSC and a BSC. Furthermore, the packet loss processing method of this embodiment may also be used to detect a reason for packet loss between a BTS or a BSC and another transmission network node supporting a transmission quality measurement protocol. Then, as long as it is between two transmission devices supporting the transmission quality measurement protocol, the method of this embodiment may be adopted to implement detection of the reason for packet loss. The foregoing description takes a mobile transmission network as an example, and similarly, the technical solution of this embodiment is also applicable for other transmission networks.

In the packet loss processing method of this embodiment, a destination network node device receives data sent through at least two transmission quality measurement protocol links by a source network node device, where service priorities of the at least two transmission quality measurement protocol links are different; and determines a reason for occurrence of packet loss according to packet loss ratios on the at least two transmission quality measurement protocol links and the service priorities of the at least two transmission quality measurement protocol links when it is detected that packet loss occurs on the at least two transmission quality measurement protocol links. By adopting the technical solution of this embodiment, a reason for occurrence of packet loss can be accurately determined according to a packet loss ratio of a data packet and a priority of a transmission quality measurement protocol link for transmitting the data packet. Compared with the prior art, a determining process is simple, and a determining result is accurate. Therefore, the technical solution of this embodiment for distinguishing bit error packet loss and congestion packet loss is high in efficiency.

The prior art further provides a method for distinguishing congestion packet loss and bit error packet loss, which is specifically a method for comprehensively performing determination by adopting two indexes: a packet loss ratio and a transmission delay. In the method, determination is performed mainly by utilizing a feature that congestion increases a transmission delay, but the method is easily interfered by a transmission networking manner such as microwave and a satellite, and influenced by a factor such as weather, and its own transmission delay is unstable, so the method also causes erroneous determination easily. Compared with the method, the packet loss processing method of this embodiment is not interfered by a transmission networking manner such as microwave and a satellite, and is not influenced by a factor such as weather either. As long as the processing method recorded in the foregoing embodiment is adopted, bit error packet loss and congestion packet loss may be accurately distinguished. Moreover, the packet loss processing method of this embodiment may be applied in a complex networking scenario such as multi-point or multi-layer convergence, and has strong applicability.

Optionally, on the basis of the technical solution of the foregoing embodiment, at least two transmission quality measurement protocol links whose service priorities are different need to be defined between a source network node device and a destination network node device in advance. Transmission quality measurement protocol links with different service priorities may be selected according to importance of bearer service data. The importance of the bearer service data may also be measured by using a service priority corresponding to the bearer service data. For example, the service priority of the bearer service data may be divided autonomously according to a specific service type and a user need. For example, in a mobile transmission network, a plurality of service priorities may be obtained through dividing according to maintenance service data, signaling service data, a real-time voice service, a data service private-line subscriber, and a gold medal user, a silver medal user, and a copper medal user of a data service, so as to satisfy service quality needs of services of different priorities. Certainly, dividing of service priorities does not limit the foregoing dividing manner of service priorities. Bearer service data with a high service priority is transmitted by preferentially selecting a transmission quality measurement protocol link with a high priority. Bearer service data with a low service priority is transmitted by preferentially selecting a transmission quality measurement protocol link with a low priority. After beginning to receive a data packet sent through at least two transmission quality measurement protocol links by the source network node device, the destination network node device may detect whether packet loss occurs on the at least two transmission quality measurement protocol links, and may specifically determine, by detecting received data, whether packet loss occurs on a corresponding transmission quality measurement protocol link; reference may be made to the related prior art for details, which are not repeatedly described here.

Optionally, the determining a reason for occurrence of packet loss according to packet loss ratios on the at least two transmission quality measurement protocol links and the service priorities of the at least two transmission quality measurement protocol links when the destination network node device detects that packet loss occurs on the at least two transmission quality measurement protocol links in the foregoing embodiment may specifically adopt the following manner:

determining, by the destination network node device, whether the packet loss ratios on the at least two transmission quality measurement protocol links and the service priorities of the at least two transmission quality measurement protocol links are in an inverse proportion relationship; and if yes, determining, by the destination network node device, that the occurring packet loss is packet loss caused by network congestion;

otherwise, further determining, by the destination network node device, whether the packet loss ratios on the at least two transmission quality measurement protocol links are approximately equivalent, and if yes, determining, by the destination network node device, that the packet loss is packet loss caused by a bit error; and if no, determining, by the destination network node device, that the packet loss is packet loss simultaneously caused by network congestion and a bit error.

Optionally, on the basis of the technical solution recorded in the foregoing embodiment, when the destination network node device determines that the occurring packet loss is the packet loss caused by network congestion, a message packet of the packet loss caused by network congestion may further be sent to the source network node device, so that the source network node device starts congestion control according to the reason for packet loss.

Optionally, on the basis of the technical solution recorded in the foregoing embodiment, an alarm signal is sent out when the destination network node device determines that the packet loss is the packet loss caused by a bit error, so as to inform work personnel that bit error packet loss occurs, so that the work personnel detect and repair a link in time.

Figure 2:
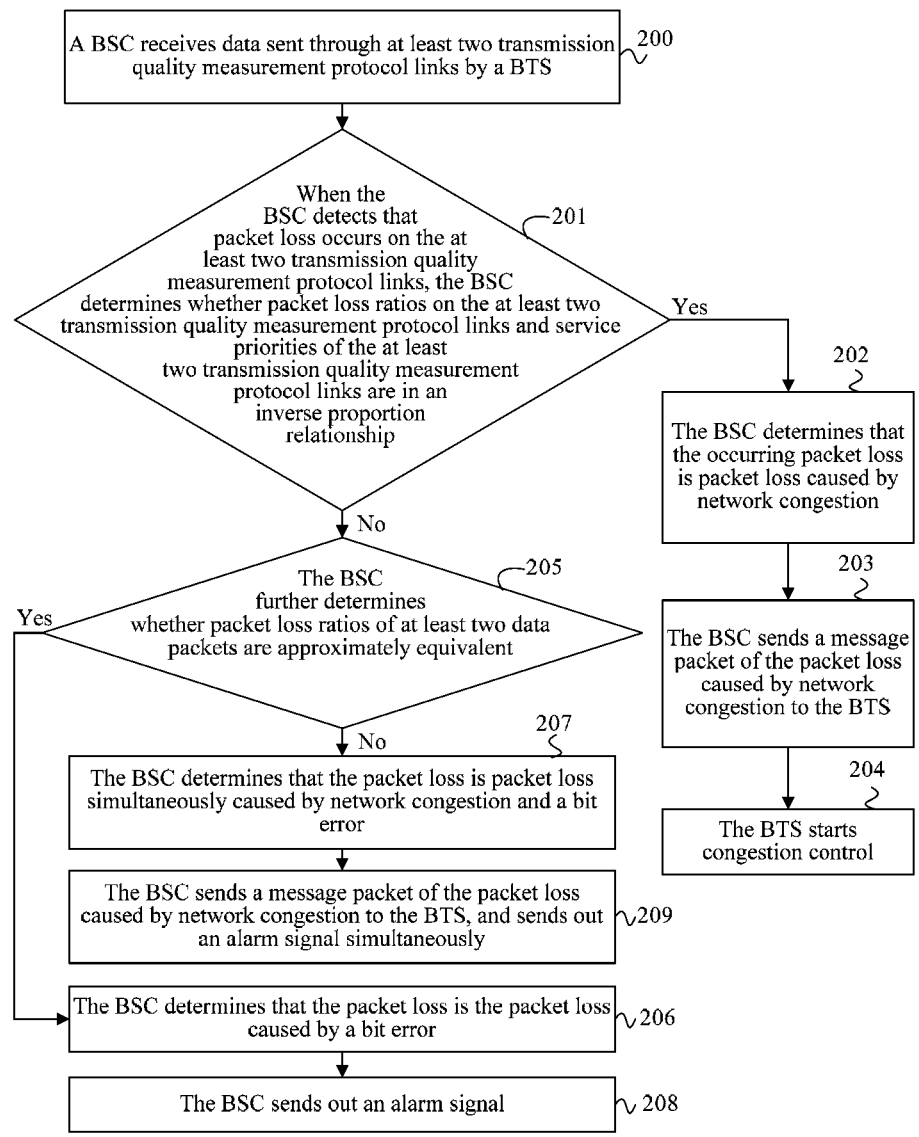
FIG. 2 is a flow chart of a packet loss processing method according to a second embodiment of the present invention.

FIG. 2 is a flow chart of a packet loss processing method according to a second embodiment of the present invention. In this embodiment, that the packet loss processing method is applied to detect a transmission network formed of a BTS and a BSC is taken as an example. As shown in FIG. 2, the packet loss processing method of this embodiment may specifically include the following steps:

Step 200: A BSC receives data sent through at least two transmission quality measurement protocol links by a BTS, and step 201 is executed.

Service priorities of the at least two transmission quality measurement protocol links are different.

Step 201: When the BSC detects that packet loss occurs on the at least two transmission quality measurement protocol links, the BSC determines whether packet loss ratios on the at least two transmission quality measurement protocol links and the service priorities of the at least two transmission quality measurement protocol links are in an inverse proportion relationship; and if yes, step 202 is executed; otherwise, if no, step 205 is executed.

The detecting, by the BSC, that packet loss occurs on the at least two transmission quality measurement protocol links may be specifically implemented by detecting a data packet received through the at least two transmission quality measurement protocol links; when the BSC detects that a packet loss ratio on at least one transmission quality measurement protocol link of the at least two transmission quality measurement protocol links is not equal to 0, the BSC determines that packet loss occurs on the at least two transmission quality measurement protocol links. Otherwise, if the BSC detects that the packet loss ratios on the at least two transmission quality measurement protocol links are both 0, the BSC determines that no packet loss occurs on the at least two transmission quality measurement protocol links.

That the BSC determines whether packet loss ratios on the at least two transmission quality measurement protocol links and the service priorities of the at least two transmission quality measurement protocol links are in an inverse proportion relationship is specifically that the BSC determines whether a transmission quality measurement protocol link with a higher packet loss ratio is just a transmission quality measurement protocol link with a lower service priority; and whether a transmission quality measurement protocol link with a lower packet loss ratio is just a transmission quality measurement protocol link with a higher service priority; and if yes, determines that the packet loss ratios on the at least two transmission quality measurement protocol links and the service priorities of the at least two transmission quality measurement protocol links are in an inverse proportion relationship; otherwise, determines that the packet loss ratios on the at least two transmission quality measurement protocol links and the service priorities of the at least two transmission quality measurement protocol links are not in an inverse proportion relationship.

Step 202: The BSC determines that the occurring packet loss is packet loss caused by network congestion; and step 203 is executed.

Step 203: The BSC sends a message packet of the packet loss caused by network congestion to the BTS; and step 204 is executed.

Step 204: The BTS starts congestion control; and the procedure ends.

Specifically, the BTS may execute an operation such as control on traffic of the sent data packet, so as to gradually message a congestion packet loss phenomenon.

Step 205: The BSC further determines whether the packet loss ratios on the at least two transmission quality measurement protocol links are approximately equivalent; and if yes, step 206 is executed; otherwise, step 207 is executed.

Specifically, here, if a difference between the packet loss ratios on the two transmission quality measurement protocol links is within a range of 0-05%, it is regarded that the packet loss ratios on these two transmission quality measurement protocol links are approximately equivalent.

Step 206: The BSC determines that the packet loss is packet loss caused by a bit error; and step 208 is executed.

Step 207: The BSC determines that the packet loss is packet loss simultaneously caused by network congestion and a bit error; and step 209 is executed.

Step 208: The BSC sends out an alarm signal.

Specifically, here, the alarm signal sent out is used to prompt maintenance personnel, so that the maintenance personnel detect and repair in time a physical link for transmitting the data packet.

Step 209: The BSC sends a message packet of the packet loss caused by network congestion to the BTS, and sends out an alarm signal simultaneously.

In the packet loss processing method of this embodiment, a BSC can accurately determine, according to packet loss ratios on at least two transmission quality measurement protocol links and service priorities of the at least two transmission quality measurement protocol links, a reason for packet loss occurring on the at least two transmission quality measurement protocol links. Compared with the prior art, a determining process is simple, and a determining result is accurate. Therefore, the technical solution of this embodiment for distinguishing bit error packet loss and congestion packet loss is high in efficiency. Moreover, the packet loss processing method of this embodiment may be applied in a complex networking scenario such as multi-point or multi-layer convergence, and has strong applicability.

It should be noted that, there is a replacement solution for the foregoing embodiment, where after step 200, it may also be included that the BSC obtains a packet loss ratio of each transmission quality measurement protocol link, and notifies the BTS of the packet loss ratio of each transmission quality measurement protocol link, and then the BTS executes the foregoing subsequent steps. Reference may be made to the record of the foregoing embodiment for details, which are not repeatedly described here.

The technical solution of the present invention is analyzed in detail in the following by taking a situation of packet loss between a BTS and a BSC in a mobile transmission network as an example.

First, totally three IP PM links 1, 2, and 3 respectively corresponding to services with different priorities 1, 2, and 3 are established between a BTS and a BSC. The priority 1 is a highest priority, and the priority 3 is a lowest priority. Packet loss ratios of several groups of data packets are separately measured by adopting the foregoing three links, and several groups of results obtained through measurement are as follows:

First group of results:
link 1—priority 1: packet loss ratio being 0
link 2—priority 2: packet loss ratio being 0
link 3—priority 3: packet loss ratio being 0
Second group of results:
link 1—priority 1: packet loss ratio being 0
link 2—priority 2: packet loss ratio being 0
link 3—priority 3: packet loss ratio being 1%
Third group of results:
link 1—priority 1: packet loss ratio being 0.1%
link 2—priority 2: packet loss ratio being 0.11%
link 3—priority 3: packet loss ratio being 0.1%
Fourth group of results:
link 1—priority 1: packet loss ratio being 0.1%
link 2—priority 2: packet loss ratio being 0.1%
link 3—priority 3: packet loss ratio being 1.1%

According to two features that packet loss caused by a bit error is irrelevant to a priority, and packet loss first occurs in a service with a low priority during congestion, it is very easy to determine the results.

The first group of results: It is obviously a circumstance that neither congestion packet loss nor bit error packet loss exists.

The second group of results: No packet loss phenomenon occurs in either of two groups of statistical results of services with high priorities, and only a service with the lowest priority generates a packet loss ratio of 1%, so very obviously, it is a result caused by occurrence of congestion packet loss, and a service which generates packet loss (namely, the service with the priority 3) and a packet loss severity degree (the packet loss ratio of 1%) may be accurately determined.

The third group of results: Also obviously, it is caused by bit error packet loss; according to a feature that the packet loss caused by a bit error does not distinguish different services and different priorities, if bit error packet loss exists, degrees of packet loss existing in services with all priorities should be approximately equivalent, which is just a situation reflected by the third group of results.

The fourth group of results: It is a circumstance that bit error packet loss and congestion packet loss exist simultaneously, and the packet loss ratio with the lowest priority 3 is obviously higher than a packet loss ratio of a service with a higher priority, so it may be explicitly determined that in this case, congestion occurs certainly, and causes the service with the lowest priority to begin packet loss; however meanwhile, packet loss ratios of services with priority 1 and priority 2 are not zero either, but the packet loss ratios of the two priorities are approximately equivalent, which is obviously caused by simultaneous existence of bit error packet loss. Respective severity degrees of bit error packet loss and congestion packet loss may also be obtained from this group of data very easily, a bit error packet loss ratio is 0.1%, and the congestion packet loss ratio is 1%.

In an actual application, links with more priorities may be established, and distinguishing of reasons for packet loss of more complex scenarios may be solved. Meanwhile, in the method of this embodiment, a result may be obtained through real-time calculation completely according to a measurement result without any attempt, no influence is caused to data packet transmission, and user service quality does not need to be sacrificed, so the technical solution of this embodiment is high in determining efficiency, and strong in applicability.

Persons of ordinary skill in the art should understand that, all or a part of the steps of the foregoing method embodiments may be implemented by a program instructing relevant hardware. The foregoing program may be stored in a computer readable storage medium. When the program is run, the steps of the foregoing method embodiments are performed. The foregoing storage medium may be any medium capable of storing program codes, such as a ROM, a RAM, a magnetic disk, or an optical disk.

Figure 3:
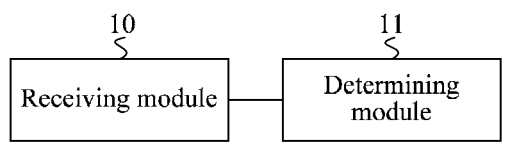
FIG. 3 is a schematic structural diagram of a destination network node device according to a third embodiment of the present invention.

FIG. 3 is a schematic structural diagram of a destination network node device according to a third embodiment of the present invention. As shown in FIG. 3, the destination network node device of this embodiment is located in a mobile transmission network, and the destination network node device may be a BTS or a BSC. The destination network node device of this embodiment may specifically include: a receiving module 10 and a determining module 11.

The receiving module 10 is configured to receive data sent through at least two transmission quality measurement protocol links by a source network node device, where service priorities of the at least two transmission quality measurement protocol links are different; and the source network node device is a BTS or a BSC. The determining module 11 connects to the receiving module 10, and the determining module 11 is configured to determine a reason for occurrence of packet loss according to packet loss ratios on the at least two transmission quality measurement protocol links and the service priorities of the at least two transmission quality measurement protocol links when the receiving module 10 detects that packet loss occurs on the at least two transmission quality measurement protocol links used for receiving data.

An implementation mechanism for the destination network node device of this embodiment to implement the packet loss processing method by adopting the foregoing modules is the same as an implementation mechanism of the foregoing related method embodiment; reference may be made to the record of the foregoing related method embodiment for details, which are not repeatedly described here.

The destination network node device of this embodiment receives, by adopting the foregoing modules, data sent through at least two transmission quality measurement protocol links by a source network node device, where service priorities of the at least two transmission quality measurement protocol links are different; and determines a reason for occurrence of packet loss according to packet loss ratios on the at least two transmission quality measurement protocol links and the service priorities of the at least two transmission quality measurement protocol links when it is detected that packet loss occurs on the at least two transmission quality measurement protocol links. By adopting the technical solution of this embodiment, a reason for occurrence of packet loss can be accurately determined according to a packet loss ratio of a data packet and a priority of a transmission quality measurement protocol link for transmitting the data packet. Compared with the prior art, a determining process is simple, and a determining result is accurate. Therefore, the technical solution of this embodiment for distinguishing bit error packet loss and congestion packet loss is high in efficiency.

Figure 4:
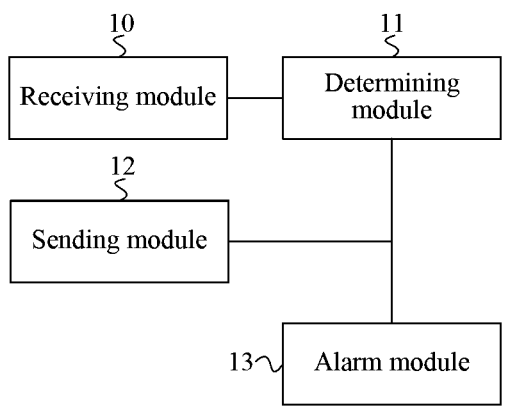
FIG. 4 is a schematic structural diagram of a destination network node device according to a fourth embodiment of the present invention.

FIG. 4 is a schematic structural diagram of a destination network node device according to a fourth embodiment of the present invention. On the basis of the foregoing embodiment shown in FIG. 3, the determining module 11 in the destination network node device of this embodiment is specifically configured to determine, when the receiving module 10 detects that packet loss occurs on the at least two transmission quality measurement protocol links used for receiving data, whether the packet loss ratios on the at least two transmission quality measurement protocol links and the service priorities of the at least two transmission quality measurement protocol links are in an inverse proportion relationship; and if yes, determine that the occurring packet loss is packet loss caused by network congestion; otherwise, further determine whether the packet loss ratios on the at least two transmission quality measurement protocol links are approximately equivalent, and if the packet loss ratios on the at least two transmission quality measurement protocol links are approximately equivalent, determine that the packet loss is packet loss caused by a bit error; and if the packet loss ratios on the at least two transmission quality measurement protocol links are not approximately equivalent, determine that the packet loss is packet loss simultaneously caused by network congestion and a bit error. As shown in FIG. 4, the network node device of this embodiment further includes a sending module 12. The sending module 12 connects to the determining module 11, and the sending module 12 is configured to, when the determining module 11 determines that the occurring packet loss is the packet loss caused by network congestion, send a message packet of the packet loss caused by network congestion to the source network node device, so that the source network node device starts congestion control according to the reason for packet loss.

The network node device of this embodiment further includes an alarm module 13, where the alarm module 13 also connects to the determining module 11, and the alarm module 13 is configured to send out an alarm signal when the determining module 11 determines that the packet loss is the packet loss caused by a bit error.

An implementation mechanism for the network node device of this embodiment to implement the packet loss processing method by adopting the foregoing modules is the same as an implementation mechanism of the foregoing related method embodiment; reference may be made to the record of the foregoing related method embodiment for details, which are not repeatedly described here.

The destination network node device of this embodiment can accurately determine, by adopting the foregoing modules, according to packet loss ratios on at least two transmission quality measurement protocol links and service priorities of the at least two transmission quality measurement protocol links, a reason for packet loss occurring on the at least two transmission quality measurement protocol links. Compared with the prior art, a determining process is simple, and a determining result is accurate. Therefore, the technical solution of this embodiment for distinguishing bit error packet loss and congestion packet loss is high in efficiency. Moreover, the packet loss processing method of this embodiment may be applied in a complex networking scenario such as multi-point or multi-layer convergence, and has strong applicability.

Figure 5:
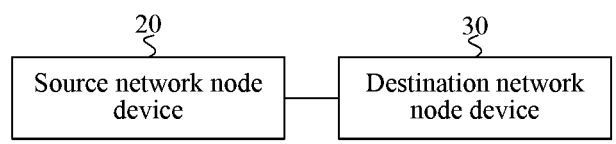
FIG. 5 is a schematic structural diagram of a mobile transmission network system according to a fifth embodiment of the present invention.

FIG. 5 is a schematic structural diagram of a mobile transmission network system according to a fifth embodiment of the present invention. As shown in FIG. 5, the mobile transmission network system of this embodiment includes a source network node device 20 and a destination network node device 30. The source network node device 20 connects to the destination network node device 30 in a communication manner. The source network node device 20 is a BTS or a BSC. The destination network node device 30 may also be a BTS or a BSC. The destination network node device 30 in the transmission network system of this embodiment is configured to receive data sent through at least two transmission quality measurement protocol links by the source network node device 20, where service priorities of the at least two transmission quality measurement protocol links are different; and determine a reason for occurrence of packet loss according to packet loss ratios on the at least two transmission quality measurement protocol links and the service priorities of the at least two transmission quality measurement protocol links when the destination network node device 30 detects that packet loss occurs on the at least two transmission quality measurement protocol links.

Optionally, the destination network node device 30 in the transmission network system of this embodiment may be the destination network node device of the foregoing third or fourth embodiment, and may specifically be implemented by adopting the packet loss processing method of the foregoing first or second embodiment; reference may be made to the record of the foregoing related embodiment for details, which are not repeatedly described here.

The transmission network system of this embodiment receives, by adopting the foregoing destination network node device, data sent through at least two transmission quality measurement protocol links by a source network node device, where service priorities of the at least two transmission quality measurement protocol links are different; and determines a reason for occurrence of packet loss according to packet loss ratios on the at least two transmission quality measurement protocol links and the service priorities of the at least two transmission quality measurement protocol links when it is detected that packet loss occurs on the at least two transmission quality measurement protocol links. By adopting the technical solution of this embodiment, a reason for occurrence of packet loss can be accurately determined according to a packet loss ratio of a data packet and a priority of a transmission quality measurement protocol link for transmitting the data packet. Compared with the prior art, a determining process is simple, and a determining result is accurate. Therefore, the technical solution of this embodiment for distinguishing bit error packet loss and congestion packet loss is high in efficiency. Moreover, the packet loss processing method of this embodiment may be applied in a complex networking scenario such as multi-point or multi-layer convergence, and has strong applicability.

It should be noted that, the source network node device and the destination network node device in the transmission network system of the foregoing embodiment may also be any two transmission devices communicating with each other and supporting a transmission quality measurement protocol.

The foregoing described apparatus embodiments are merely exemplary. The units described as separate parts may or may not be physically separated, and parts shown as units may or may not be physical units, may be located in one position, or may also be distributed on at least two network units. A part or all of the modules may be selected according to actual needs to achieve the objectives of the solutions of the embodiments. Persons of ordinary skill in the art may understand and implement the embodiments without creative efforts.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions recorded in the foregoing embodiments, or make equivalent replacements to part of technical features of the technical solutions recorded in the foregoing embodiments; however, these modifications or replacements do not make the essence of the corresponding technical solutions depart from the spirit and scope of the technical solutions of the embodiments of the present invention.

What is claimed is:

1. A packet loss processing method, wherein the method is applied in a mobile transmission network, and the method comprises:

receiving, by a destination network node device, data sent through at least two transmission quality measurement protocol links by a source network node device, wherein service priorities of the at least two transmission quality measurement protocol links are different; and determining a reason for occurrence of packet loss according to packet loss ratios on the at least two transmission quality measurement protocol links and the service priorities of the at least two transmission quality measurement protocol links when the destination network node device detects that the packet loss occurs on the at least two transmission quality measurement protocol links, wherein the source network node device is a base station or a base station controller and the destination network node device is a base station or a base station controller;

wherein determining the reason for the occurrence of the racket loss comprises:

determining, by the destination network node device, whether the packet loss ratios on the at least two transmission quality measurement protocol links and the service priorities of the at least two transmission quality measurement protocol links are in an inverse proportion relationship;

determining that the packet loss is caused by network congestion if in the inverse proportion relationship; and if not in the inverse proportion relationship, determining, by the destination network node device, whether the packet loss ratios on the at least two transmission quality measurement protocol links are approximately equivalent, and determining that the packet loss is caused by a bit error if the packet loss ratios on the at least two transmission quality measurement protocol links are approximately equivalent; and if the packet loss ratios on the at least two transmission quality measurement protocol links are not approximately equivalent, determining that the packet loss is simultaneously caused by network congestion and the bit error.

2. The method according to claim 1, further comprising: when the destination network node device determines that the packet loss is caused by network congestion, sending a message packet of the packet loss caused by network congestion to the source network node device, enable the source network node device to initiate congestion control according to the reason for the packet loss.

3. The method according to claim 1, further comprising: sending out an alarm signal when the destination network node device determines that the packet loss is caused by the bit error.

4. The method according to claim 1, wherein the detecting, by the destination network node device, that the packet loss occurs on the at least two transmission quality measurement protocol links comprises: detecting, by the destination network node device, that a packet loss ratio on at least one transmission quality measurement protocol link of the at least two transmission quality measurement protocol links is not equal to zero, and determining that the packet loss occurs on the at least two transmission quality measurement protocol links.

5. The method according to claim 1, wherein the packet loss ratios on the at least two transmission quality measurement protocol links are considered as approximately equivalent when a difference between the packet loss ratios on the at least two transmission quality measurement protocol links is within a range of 0-05%.

6. A destination network node device, wherein the destination network node device is located in a mobile transmission network, and the destination network node device is a base station or a base station controller; and the destination network node device comprises:

a receiving module, configured to receive data sent through at least two transmission quality measurement protocol links by a source network node device, wherein service priorities of the at least two transmission quality measurement protocol links are different; and the source network node device is a base station or a base station controller; and a determining module, configured to determine a reason for occurrence of packet loss according to packet loss ratios on the at least two transmission quality measurement protocol links and the service priorities of the at least two transmission quality measurement protocol links when the receiving module detects that the packet loss occurs on the at least two transmission quality measurement protocol links used for receiving data;

wherein the determining module is further configured to, when the receiving module detects that the packet loss occurs on the at least two transmission quality measurement protocol links used for receiving data, determine whether the packet loss ratios on the at least two transmission quality measurement protocol links and the service priorities of the at least two transmission quality measurement protocol links are in an inverse proportion relationship;

determine that the packet loss is caused by network congestion if in the inverse proportion relationship;

if not in the inverse proportion relationship determine whether the packet loss ratios on the at least two transmission quality measurement protocol links are approximately equivalent;

if the packet loss ratios on the at least two transmission quality measurement protocol links are approximately equivalent, determine that the packet loss is caused by a bit error; and if the packet loss ratios on the at least two transmission quality measurement protocol links are not approximately equivalent, determine that the packet loss is simultaneously caused by the network congestion and a bit error.

7. The device according to claim 6, further comprising:

a sending module, configured to, when the determining module determines that the packet loss is caused by the network congestion, send a message packet of the packet loss caused by the network congestion to the source network node device, to enable the source network node device to initiate congestion control according to the reason for the packet loss.

8. The device according to claim 6, further comprising:

an alarm module, configured to send out an alarm signal when the determining module determines that the packet loss is the packet loss caused by the bit error.

9. The destination network node device according to claim 6, wherein the packet loss ratios on the at least two transmission quality measurement protocol links are considered as approximately equivalent when a difference between the packet loss ratios on the at least two transmission quality measurement protocol links is within a range of 0-05%.

10. A mobile transmission network system, comprising a source network node device and a destination network node device, wherein the source network node device is a base station or a base station controller; wherein the destination network node device is a base station or a base station controller; and the destination network node device is configured to receive data sent through at least two transmission quality measurement protocol links by the source network node device, wherein service priorities of the at least two transmission quality measurement protocol links are different; and determine a reason for occurrence of packet loss according to packet loss ratios on the at least two transmission quality measurement protocol links and the service priorities of the at least two transmission quality measurement protocol links when it is detected that the packet loss occurs on the at least two transmission quality measurement protocol links;

wherein the destination network node is further configured to determine whether the packet loss ratios on the at least two transmission quality measurement protocol links and the service priorities of the at least two transmission quality measurement protocol links are in an inverse proportion relationship;

determine that the packet loss is caused by network congestion if in the inverse proportion relationship;

if not in the inverse proportion relationship, further determine, by the destination network node device, whether the packet loss ratios on the at least two transmission quality measurement protocol links are approximately equivalent;

determine that the packet loss is caused by a bit error if the packet loss ratios on the at least two transmission quality measurement protocol links are approximately equivalent; and if the packet loss ratios on the at least two transmission quality measurement protocol links are not approximately equivalent, determine that the packet loss is simultaneously caused by the network congestion and the bit error.

11. The mobile transmission network system according to claim 10, wherein the packet loss ratios on the at least two transmission quality measurement protocol links are considered as approximately equivalent when a difference between the packet loss ratios on the at least two transmission quality measurement protocol links is within a range of 0-05%.

* * * * *

UNITED STATES PATENT AND TRADEMARK OFFICE
CERTIFICATE OF CORRECTION

| | | |
|---|---|---|
| PATENT NO. | : 9,215,612 B2 | Page 1 of 1 |
| APPLICATION NO. | : 14/081804 | |
| DATED | : December 15, 2015 | |
| INVENTOR(S) | : Meng Chen | |

It is certified that error appears in the above-identified patent and that said Letters Patent is hereby corrected as shown below:

IN THE CLAIMS

Column 12, line 67, "racket loss" should read -- packet loss --.

Signed and Sealed this
Fifth Day of April, 2016

Michelle K. Lee
*Director of the United States Patent and Trademark Office*